United States Patent
Cannalte et al.

[11] 3,939,417
[45] Feb. 17, 1976

[54] EMERGENCY COMMUNICATIONS SYSTEM

[75] Inventors: Gary A. Cannalte, Hoffman Estates; Richard J. Crouse, Palatine; Richard D. Koenig, Elgin; Thomas J. Rollins, Arlington Heights; Donald L. Walker, Addison, all of Ill.

[73] Assignee: Motorola, Inc., Chicago, Ill.

[22] Filed: Dec. 18, 1973

[21] Appl. No.: 425,908

[52] U.S. Cl. ............... 325/5; 325/53; 325/55; 325/64; 340/213.2; 340/224; 340/226; 340/408; 343/176; 343/177; 343/200
[51] Int. Cl.² .................. H04B 7/14; H04B 1/40
[58] Field of Search .......... 325/3, 5, 16, 51, 53, 55, 325/64, 113, 117, 302; 340/31, 213.1, 213.2, 224, 226, 408; 343/176, 177, 200; 179/1 MN, 1 NE, 2 A, 2 B, 2 E, 2 DP, 5 R, 5.5, 17 A, 17 B, 17 R, 27 FF, 41 A

[56] References Cited
UNITED STATES PATENTS

| | | | |
|---|---|---|---|
| 2,803,744 | 8/1957 | Berger et al. | 343/177 |
| 3,154,642 | 10/1964 | Hall et al. | 179/17 B |
| 3,376,509 | 4/1968 | Willcox et al. | 325/53 |
| 3,384,714 | 5/1968 | Weld et al. | 179/5 R |
| 3,492,426 | 1/1970 | Foreman et al. | 179/5 R |
| 3,581,019 | 5/1971 | Ryan | 179/41 A |
| 3,586,978 | 6/1971 | Van Gorder | 325/64 |
| 3,632,890 | 1/1972 | Hugenholtz | 179/17 A |
| 3,800,089 | 3/1974 | Reddick | 179/5 R |

*Primary Examiner*—Albert J. Mayer
*Assistant Examiner*—Marc E. Bookbinder
*Attorney, Agent, or Firm*—James W. Gillman; Eugene A. Parsons

[57] ABSTRACT

A control console including a transceiver, a plurality of terminal stations positioned at spaced apart locations remote from the console and each including a transceiver connected to the console by RF or a wire line, and a plurality of call boxes positioned at spaced apart locations adjacent to each terminal station and including a transceiver in communication with the terminal station. When the hand set of a call box is lifted from the cradle a tone is transmitted through the adjacent terminal station to the console which then keys on all terminal station transmitters to indicate a busy line at other call boxes and to provide a ringing signal at the call box being used. Subsequent to transmission of the tone, a signal indicative of the address of the box and the condition of predetermined portions of the box is automatically transmitted to the console. When the console operator answers, full duplex communication is provided between the call box and the console.

11 Claims, 6 Drawing Figures

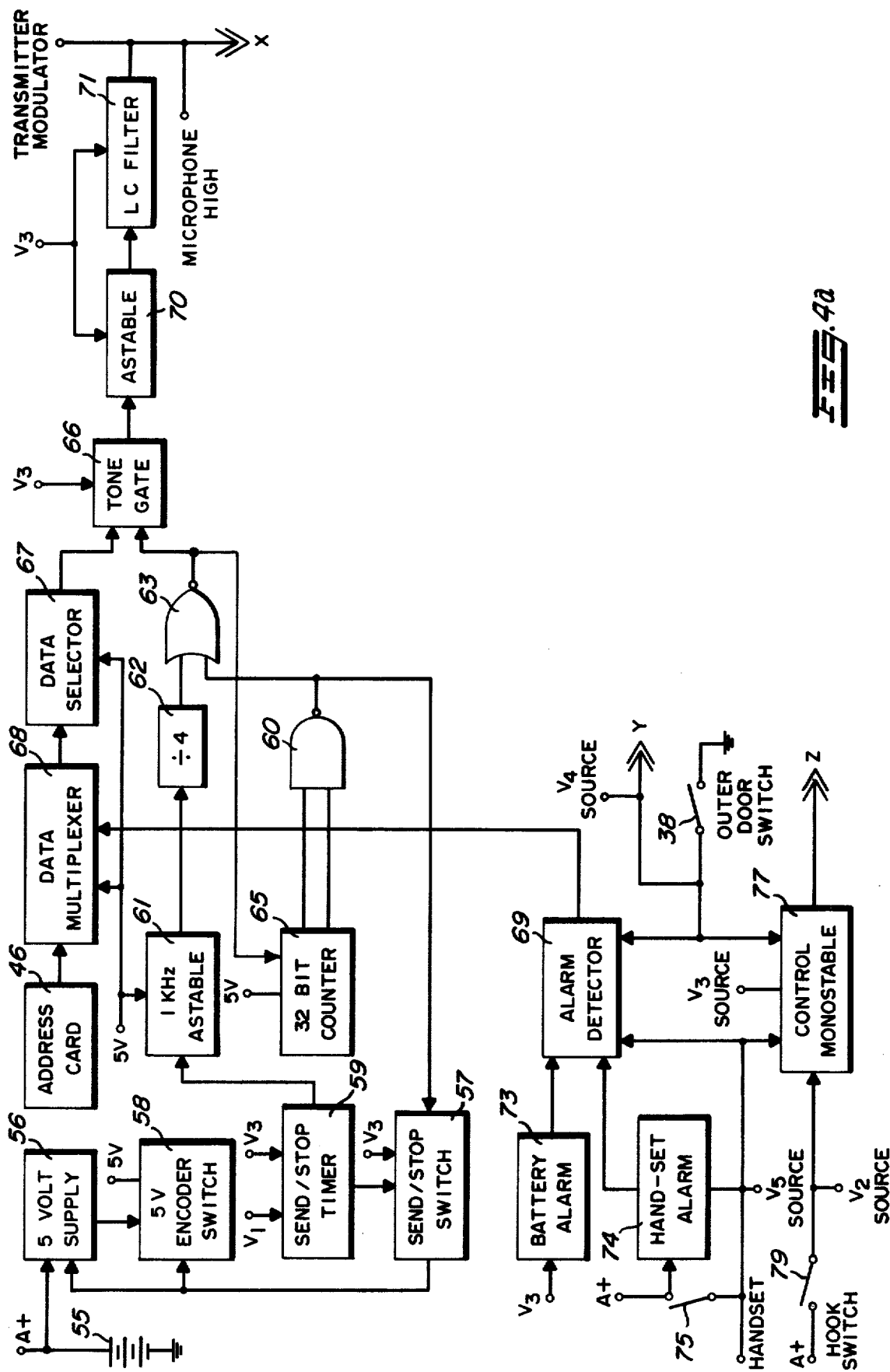

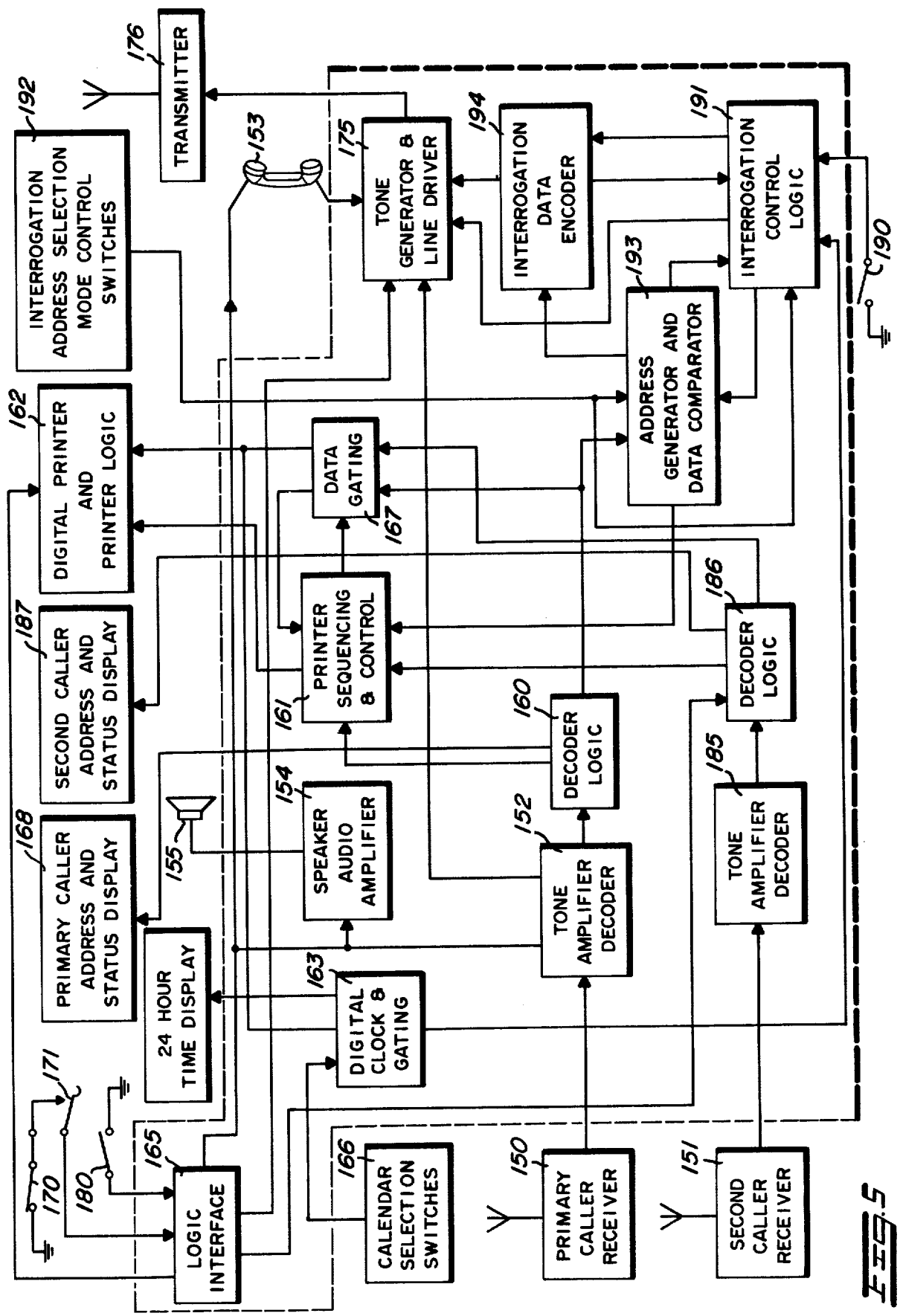

EMERGENCY COMMUNICATIONS SYSTEM

BACKGROUND OF THE INVENTION

1. Field of the Invention

Many modern highways are extremely busy but pass through relatively remote areas so that a motorist on the highway having difficulty with his automobile may have to travel a great distance to find help. Generally, the motorist walking along the highway is in great danger from the traffic, other motorists who might pick him or her up, the weather (if severe), etc.

2. Description of the Prior Art

Some prior art emergency call boxes have been provided and these generally fall into two classes. The first class is the box which is hard-wired into the desired position and cannot be moved, which class generally includes actual telephones, and the second class includes boxes simply having buttons therein, which buttons are to be depressed for certain types of emergencies, for example, fire, police, tow truck, etc. The former type of boxes are unsatisfactory because they are not portable and the positions of the boxes cannot be altered as conditions on the highways vary. The latter type of box is highly unsatisfactory because the motorist depressing a button in the box has no indication whether the box is working until help arrives at some subsequent time. With no indication as to whether the box is operating properly, a motorist could stand for hours waiting for help that had not been summoned.

SUMMARY OF THE INVENTION

The present invention pertains to an emergency communications system including a control console with a transceiver, a plurality of terminal stations positioned at spaced apart locations each having a transceiver in communication with said console and a plurality of call boxes positioned at spaced apart locations adjacent to each terminal station, each call box including a transceiver tuned for full duplex communications with the transceiver in the adjacent terminal station. Each call box includes a hand set which upon being uncradled causes the transmitter to transmit a tone to the console and the console keys the transmitter in each of the terminal stations to provide an indication in the remaining call boxes that the primary channel is being used. Subsequent to the transmission of the tone the call box automatically transmits a signal indicative of the address of the call box and the condition of certain predetermined portions of the call box. Periodically the receiver is turned on in each call box and the console has the capability of sending an interrogate signal which will key the transmitter in any desired call box to transmit a signal indicative of the condition of predetermined portions of the call box. If the primary channel is busy a second caller is automatically switched to a second channel whch provides an indication at the console of the second caller and when the console operator terminates the first call the second caller is automatically connected into the primary channel.

It is an object of the present invention to provide an improved emergency communications system.

It is a further object of the present invention to provide an emergency communications system including a plurality of call boxes positionable along a highway or the like and capable of being easily moved as traffic patterns or conditions are altered or capable of being readily exchanged for servicing and the like.

It is a further object of the present invention to provide an emergency communications system wherein each call box provides an indication of its condition each time it is used and any or all of the call boxes can be interrogated from a main console whenever desired.

It is a further object of the present invention to provide an emergency communications system which automatically provides a check on the operation of the system when a motorist raises the hand set of one of the call boxes.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIGS. 4a and 4b are block diagrams of an embodiment of the logic electronics utilized in a single call box; and FIG. 5 is a block diagram of the electronics utilized in the console of the system.

DESCRIPTION OF THE PREFERRED EMBODIMENT

Figure 1:
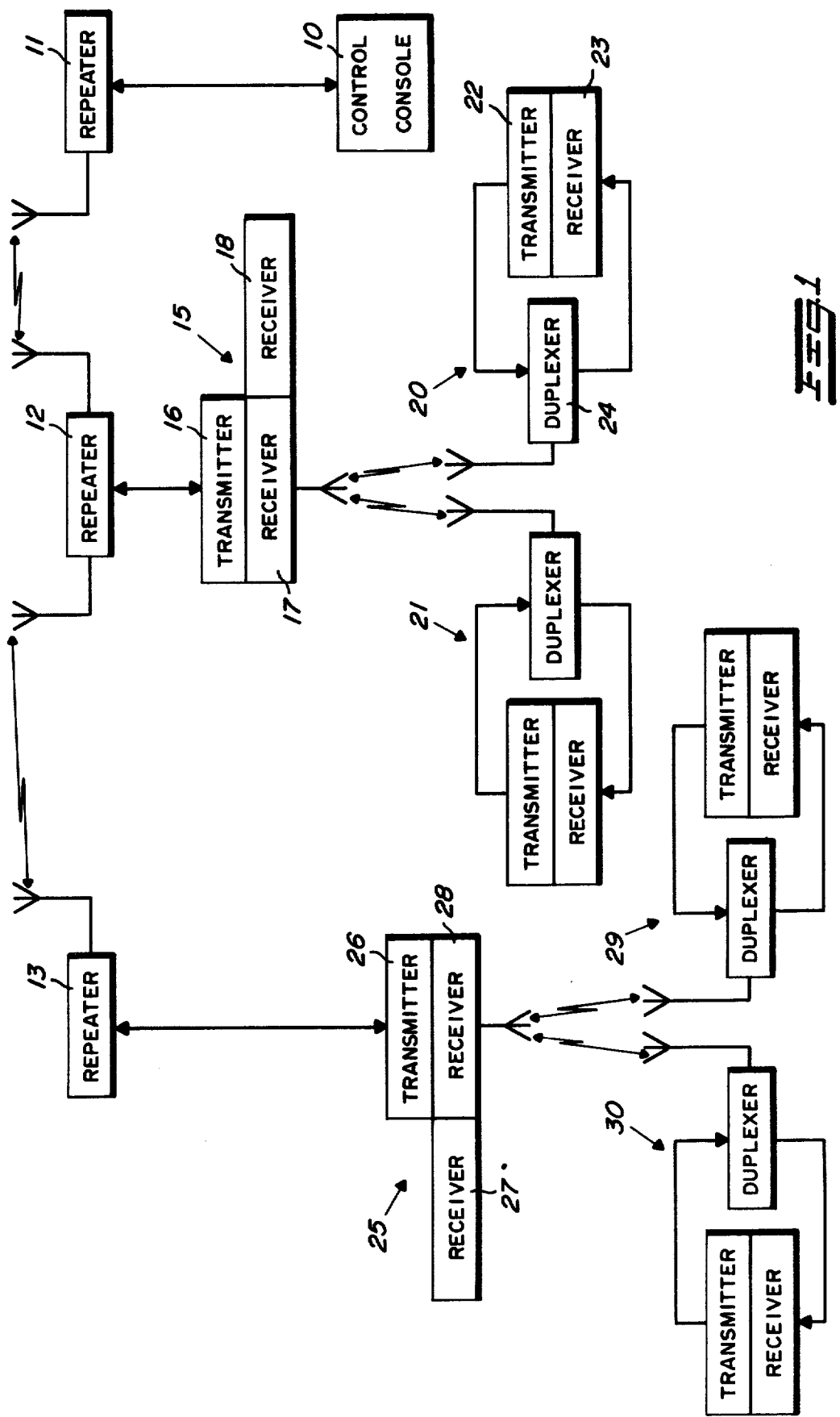
FIG. 1 is a block diagram of an embodiment of the emergency communications system.

Referring specifically to FIG. 1, a control console 10 is wire connected to an RF repeater 11, which is in communication with an RF repeater 12, RF repeater 12 being in communication with an RF repeater 13. The repeaters 11, 12 and 13 are in spaced apart relation to cover a predetermined area, such as a highway or the like. Further, the repeaters 11, 12 and 13 form a backbone for communication with the control console 10 and it should be understood that while RF repeaters are illustrated the backbone could consist of telephone lines, cables, or any other means of conveying information over relatively long distances. Further, while repeaters are illustrated in block form it should be understood that these might be replaced by simple terminal boxes if the backbone is a wire or cable system.

The repeater 12 is connected to a terminal station generally designated 15 by means of a wire, cable or the like. The terminal station 15 includes a transmitter 16 and two receivers 17 and 18, each tuned to a separate frequency. A pair of call boxes, generally designated 20 and 21, are positioned in spaced apart relationship adjacent to the terminal station 15 so as to be in communication therewith at all times. The call box 20 includes a transmitter 22 tunable to either of the two frequencies of the receivers 17 and 18 in the adjacent terminal station 15, a receiver 23 tuned to the frequency of the transmitter 16 in the adjacent terminal station 15, and a duplexer 24 for providing full duplex communication between the call box 20 and the terminal station 15. The call box 21 is similar to the call box 20 and is in full duplex communication with the terminal station 15.

The repeater 13 has a terminal station generally designated 25 connected thereto by means of wires, cable, etc., which terminal station 25 includes a transmitter 26 and two receivers 27 and 28 tuned to two different frequencies. The terminal station 25 is spaced from the terminal station 15 but the frequencies of the transmitter 26 and receivers 27 and 28 differ from the frequencies of the transmitter 16 and receivers 17 and 18 to prevent any cross-communication between the receivers of the transmitter 26 and the receivers of the transmitter 16. A pair of similar call boxes 29 and 30 are positioned in spaced apart relation adjacent to the terminal station 25 and are in full duplex communication therewith similar to the call box 20 previously described. While only two call boxes are associated with each of the terminal stations 15 and 25 in the present embodiment, it should be understood that any convenient number may be utilized, depending upon the spacing of the call boxes, the type of terrain, the strength of the transmitters and sensitivity of the receivers. Further, as will become apparent presently, the number of call boxes per terminal station can be quickly and easily changed to comply with changing conditions, e.g., seasonal traffic patterns.

Figure 2:
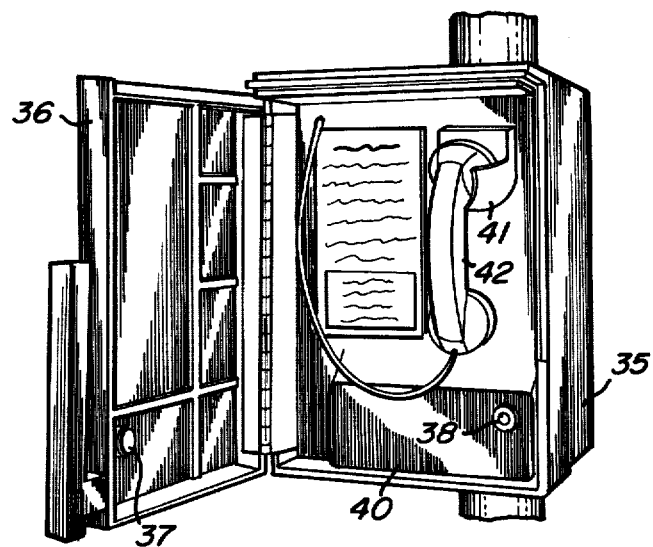
FIG. 2 is a view in perspective of a single call box utilized in the system, with the access door open.
Figure 3:
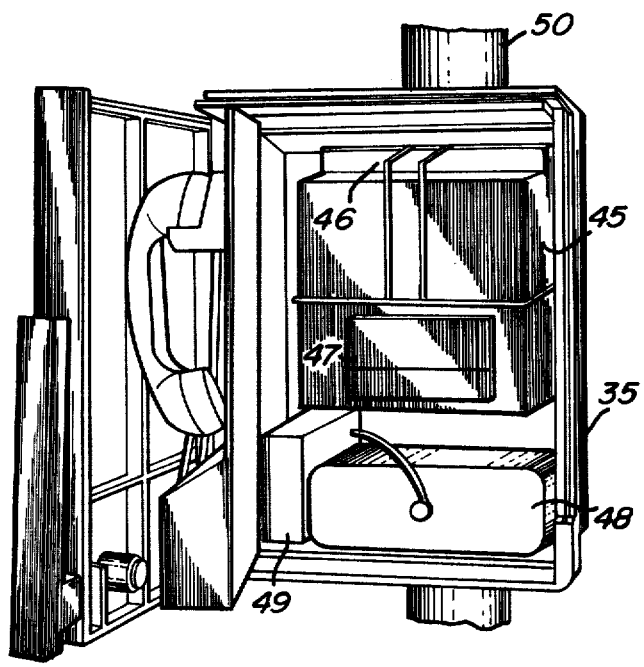
FIG. 3 is a view in perspective of the call box illustrated in FIG. 2 with the inner door open.

Referring to FIGS. 2 and 3, a single call box is illustrated having an outer weatherproof housing 35 with an access door 36 forming the front wall thereof. The door 36 is normally held closed by a magnet 37 and a switch 38 is activated when the door 36 is opened, the operation of which will be described in more detail presently. Inside the housing 35 an inner door 40 is normally locked in the closed position, illustrated in FIG. 2, but may be opened to the position illustrated in FIG. 3 for maintenance or repair. The inner door 40 has a cradle 41 thereon for receiving a hand set 42, which hand set 42 includes a microphone and speaker similar to the hand set on a telephone. The cradle 41 has a switch therein which is operated by the normal cradling of the hand set 42 therein, which operation will be described in more detail presently.

Referring more specifically to FIG. 3, the electronic circuitry is contained in a package 45, which package 45 has a plug in address card 46 engaged at one side thereof. The entire electronics package 45 is quickly and easily replaceable, for maintenance or repair purposes, and a new package positioned in the housing 35 will maintain the same address by simply removing the address card 46 from the old package and plugging it into the new package. The duplexer for the transceiver in the package 45 is affixed to the front of the package 45 in a unit designated 47. Power for the call box is provided by a rechargeable battery 48 positioned in the bottom of the housing 35. A charger unit 49 is illustrated adjacent to the battery 48 and may be incorporated in the housing 35 if power is readily available therefor. A sensor for indicating the condition of the battery 48 is located in the electronics package 45. In general, the housing 35 will be affixed to a vertical pole 50 and the antenna for the transceiver in the package 45 will be affixed near the top of the pole 50 in some convenient manner.

Figure 4B:
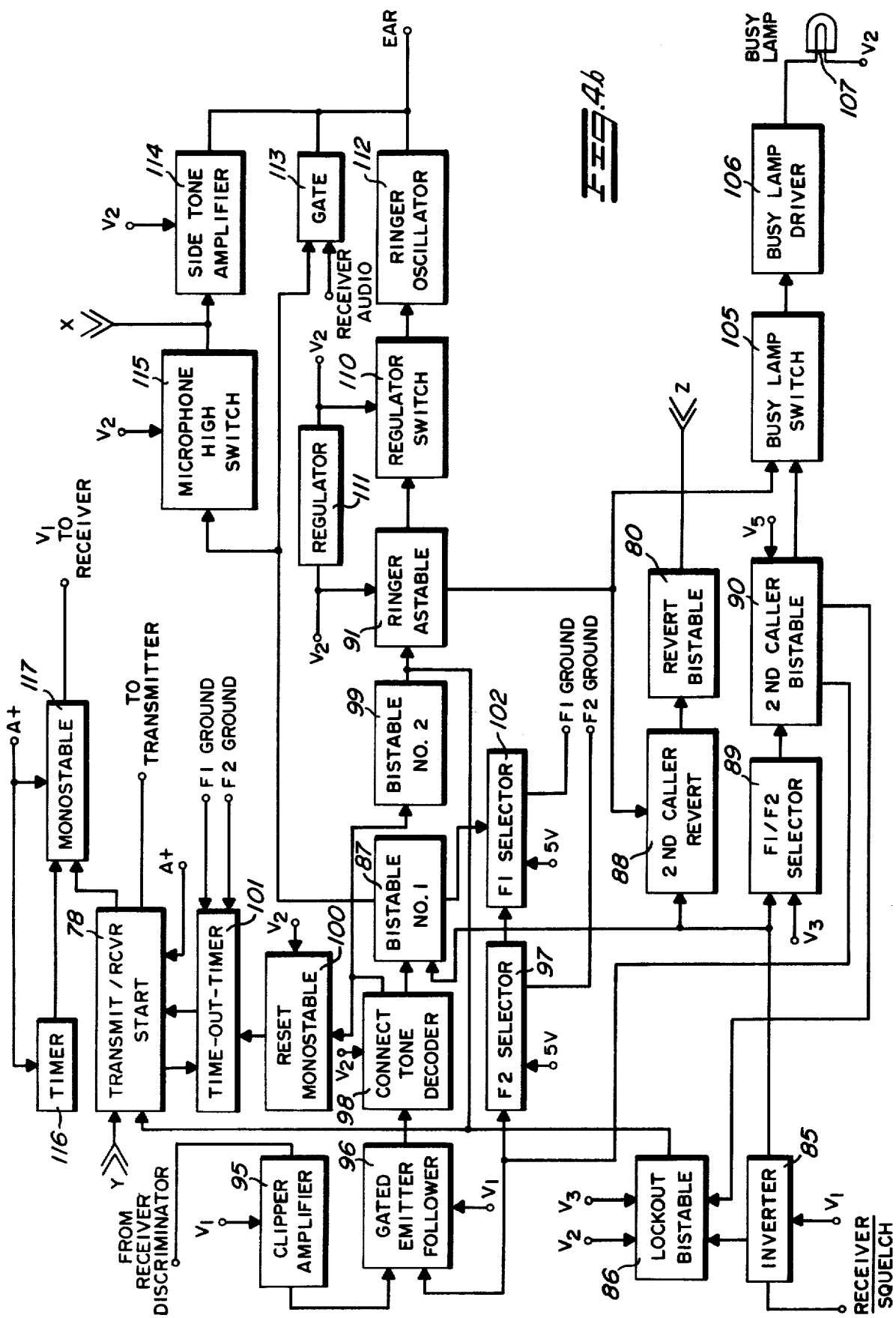

Referring to FIGS. 4a and 4b, it should be noted that this is a single block diagram illustrated on two sheets because of the size and connected at the points indicated. A battery 55 is connected between ground and a terminal, designated A+, which is connected to a 5 volt supply circuit 56. The battery 55 is approximately 13 volts but may vary a few volts with the ambient temperature. The 5 volt supply circuit 56 simply reduces the battery A+ voltage the desired amount. The 5 volt supply 56 is turned on by means of a send/stop switch 57 connected thereto, which switch 57 also turns on a 5 volt encoder switch 58 so that the 5 volts from the supply 56 can be applied therethrough on a terminal, designated 5V, to various other circuits which will be described presently. The send/stop switch 57 receives an input from a send/stop timer 59 and a NAND gate 60, and receives an activating voltage on a terminal designated $V_3$. The send/stop timer receives activating voltages on terminals designated $V_1$ and $V_3$ and also supplies a signal to a 1 KHz astable circuit 61. The astable circuit 61 supplies a signal through a divide by 4 circuit 62 to one terminal of a NOR gate 63, a second terminal of which is connected to the output of the NAND gate 60. Two inputs of the NAND gate 60 are supplied by a 32 bit counter 65 wich is connected to the 5V terminal of the encoder switch 58 and starts when the switch 58 is operated and which receives clock pulses from the output of the NOR gate 63. The output of the NOR gate 63 is applied to a bistable circuit 66, which is also placed in an operating mode by application of voltage to a terminal designated $V_3$. A second input of the bistable 66 is received from a data selector circuit 67 which in turn receives an input from a data multiplexer circuit 68. The data selector circuit 67 may be, for example, an MC9309, MTTL integrated circuit manufactured by Motorola, Inc. which consists of two 4-channel data selectors with common control lines, constructed from high level AND-OR-INVERT gates with active pull-up outputs and low level inverters on the control inputs. The multiplexer circuit 68 receives a first signal from the address card 46 (see the plug in address card 46 of FIG. 3) and a second input signal from an alarm detector circuit 69. The astable circuit 61, data selector 67 and multiplexer 68 are all connected to the 5 V terminal of the encoder switch 58 and cease operation when the voltage is removed therefrom. An astable multivibrator 70 operates at a center frequency of 1500 Hz whenever a voltage is applied to the terminal $V_3$ connected thereto. The frequency of the astable 70 is varied ±300 Hz about the center frequency by the output of the tone gate 66. The output of the astable 70 is converted to a sine wave by an LC filter 71 and applied to the transmitter modulator (not shown) and the audio high lead of the microphone.

A battery alarm circuit 73 is rendered active by the application of the voltage to the terminal $V_3$, connected to the circuit 73. The battery alarm circuit 73 provides an indication of the condition of the battery and contains a circuit which automatically compensates for changes in ambient temperature. For example, if the temperature is a −40°C the battery output can drop to 11 volts before an alarm is sounded and if the temperature rises to 80°C the voltage of the battery must exceed 14 volts or the circuit 73 will provide an alarm. The output of the circuit 73 is applied to the alarm detector circuit 69. A hand set alarm circuit 74 also supplies an output signal to the alarm detector circuit 69 and receives power from the A+ terminal of the battery 55. The alarm circuit 74 is rendered operative by the application of a voltage to the terminal $V_5$ connected thereto and receives alarm signals from a switch 75 on the inner door 40 and a sensor or switch in the hand set 42 (not shown). The hand set alarm 74 provides an indication to the detector 69 if the cable to the hand set 42 is cut or if the inner door 40 is open. The voltage on the terminal $V_5$ is also applied to the detector 69 and to a control monostable circuit 77. The switch 38, which is operated whenever the access door 36 is opened, supplies a ground connection to the alarm detector 69, the control monostable 77 and a transmit/receive $V_4$ start circuit 78. Whenever the hand set 42 is removed from the cradle 41 a switch 79 is closed connecting the A+ terminal of the battery 55 to all terminals designated $V_2$ of FIG. 4 and to the control monostable 77. The control monostable 77 supplies a voltage to all terminals designated $V_3$ of FIG. 4 in accordance with a signal received from a revert bistable circuit 80 (see FIG. 4b).

An inverter 85, which is made operative by a voltage appearing on the terminal $V_1$ connected thereto, receives an input signal from the receiver (not shown) which indicates whether the receiver is squelched or unsquelched. The inverter 85 supplies an output to a lockout bistable circuit 86, a connect tone bistable No. 1 circuit 87, a second caller revert circuit 88 and an $F_1/F_2$ select circuit 89. The lockout bistable circuit 86 also receives an input from a second caller bistable circuit 90 and is activated by the application of a voltage to the terminal $V_2$ and $V_3$. The lockout bistable circuit 86 provides a signal to the transmit/receive $V_4$ start circuit 78 and to a ringer astable circuit 91. An output from the receiver discriminator (not shown) is supplied through a clipper amplifier 95 to a gated emitter follower 96. The amplifier 95 is rendered operable by the application of a voltage to the terminal $V_1$ connected thereto, which terminal is also connected to the emitter follower 96. The second caller bistable 90 also supplies an input to the gated emitter follower 96 and to an $F_2$ select circuit 97. The output of the gated emitter follower circuit 96 is applied to a connect tone decoder circuit 98. The output of the decoder circuit 98 is applied to the bistable No. 1 circuit 87, a bistable No. 2 circuit 99 and a reset monostable circuit 100. The application of a voltage to the terminal $V_2$, which is connected to the decoder 98 is also necessary to the operation thereof. The application of a voltage to the terminal $V_2$, which is connected to the monostable 100, is necessary to the operation thereof. Reset signals from the monostable 100 are connected to a time out timer 101 which receives voltage for the operation thereof from the $V_4$ start circuit 78. The time out timer 101 operates to disable the $V_4$ start circuit 78 2 minutes after the timer 101 is started by applying ground to one of a pair of transmitter terminals, designated $F_1$ ground and $F_2$ ground, and to the timer 101. Operation of the transmitter is started by grounding one of the terminals, $F_1$ ground or $F_2$ ground, through a circuit $F_1$ select 102 or the $F_2$ select circuit 97, respectively. Both of the circuits 97 and 102 are rendered operative by the application of a voltage to the 5V terminal which is connected thereto. The $F_1$ select circuit 102 receives an input from the $F_2$ select circuit 97 and from the bistable No. 1 circuit 87. The $F_2$ select circuit 97 receives an input from the second caller bistable circuit 90. The second caller bistable circuit 90 also supplies an input to a busy lamp switch 105, which also receives an input from the ringer astable circuit 91. The ringer astable circuit 91 also supplies an input to the second caller revert circuit 88. The output of the busy lamp switch circuit 105 is applied to a busy lamp driver circuit 106 which upon being actuated causes a busy lamp 107, visibly mounted in the inner door 40, to operate by way of a voltage applied to the terminal $V_2$ connected thereto.

The ringer astable circuit 91, which is rendered operative by the application of a voltage to the terminal $V_2$ connected thereto, supplies an output signal to a regulator switch circuit 110, which receives a regulated voltage from the terminal $V_2$ by way of a regulator circuit 111. The regulator switch circuit 110 controls the operation of a ringer oscillator circuit 112, the output of which is supplied to the earpiece, or speaker, in the hand set 42. The output of an audio gate circuit 113 is also connected to the earpiece and one input thereof is connected to the receiver audio output. The gate circuit 113 is operated by an output from the bistable No. 1 circuit 87. In addition to the above, the earpiece receives a signal from a side tone amplifier 114, the input of which comes from the microphone audio high lead and which is rendered operative by the application of a voltage to the terminal $V_2$ connected thereto.

The output of the bistable No. 1 circuit 87 is connected to a microphone audio high switch 115, the output of which goes to the microphone audio high lead and the operation of which is dependent upon the application of a voltage to the terminal $V_2$ connected thereto. A timer circuit 116 is maintained operative by connection to the A+ terminal of the battery 55. The output of the timer circuit 116 is connected to a monostable circuit 117 which also receives its operating voltage from the battery terminal A+. The monostable 117 is controlled by a signal from the $V_4$ start circuit 78 and supplies $V_1$ voltage to all $V_1$ terminals as well as to the receiver for operation thereof. The timer circuit 116 provides trigger pulses to turn on the monostable circuit 117 every 30 seconds, which in turn supplies a voltage to the terminal $V_1$ for ½ second. This circuit allows an operator at the console 10 to interrogate the call box by periodically turning on the receiver to receive instructions from the console 10.

In the operation of the call box circuitry illustrated in FIG. 4, a motorist in trouble opens the access door 36 of the call box, which automatically operates switch 38 and grounds the transmit/receive $V_4$ start circuit 78 which supplies power to the transmitter and the time out timer 101 and gates on the monostable circuit 117 which in turn applies power to the receiver and to all terminals designated $V_1$.

The motorist then removes the hand set 42 from the cradle 41 which operates the switch 79 and applies battery voltage to all of the terminals designated $V_2$ and to the control monostable circuit 77 which applies power to all of the terminals designated $V_3$. If the receiver is squelched, that is, no signal is being received from the terminal station, the bistable No. 1 circuit 87 operates the $F_1$ select circuit 102 to supply a ground to the $F_1$ ground terminal of the transmitter and allow transmission on the primary frequency. The $V_3$ voltage provided by the control monostable 77 starts the send/stop timer circuit 59 and the astable circuit 70. The send/stop timer 59 provides a 500 millisecond output, during which time the astable circuit 70 modulates the transmitter with a 1500 Hz center tone. After 500 milliseconds the output of the send/stop timer 59 drops and turns on the 1 KHz astable circuit 61 which causes the bistable circuit 66 to operate at a 250 Hz rate.

The operation of the bistable 66 is further controlled by the output of the selector 67 which provides 20 bits of information, the first 16 of which are the address of the call box (dictated by the address card 46) and the last 4 of which are indications of the condition of the call box, including the condition of the battery 55, the hand set 42, the inner door 40 and the access door 36. In the present embodiment the apparatus actually has a data encoding information signalling capability of up to 31 binary data bits, although only 20 are used. The additional 11 bits could be used for external sensing devices to report other forms of status which can be indicative of the environment or application of the individual boxes. Subsequent to the transmission of the 20 bits of data the send/stop timer 59 applies a low signal to the send/stop switch 57, which in combination with a low signal from the NAND gate 60, combines to operate the switch 57 and turn off the 5 volt supply 56 and the encoder switch 58. Turning off the encoder switch 58 removes power from the encoder (astable 61, counter 65, multiplexer 68 and selector 67) and from the $F_1$ and $F_2$ select circuits 102 and 97.

The control monostable 77 is initially turned on for one second by operation of the switch 79 and, upon turn off of the encoder switch 58 approximately 380 milliseconds of time still remain before the monostable 77 turns off. If the receiver is not unsquelched (a signal received from the terminal station) before the monostable 77 turns off, power is removed from the $V_3$ terminal and the lockout bistable circuit 86 operates to deactivate the ringer astable circuit 91 and shut off the transmit/receive $V_4$ start circuit 78, thereby removing power from the receiver and the transmitter. The hand set 42 must then be cradled to deactivate the switch 79 and removed from the cradle 41 to restart the procedure.

If the 1500 Hz center tone transmitted for 500 milliseconds reaches the console 10, the console automatically keys all of the terminal station transmitters, 16 and 26 in FIG. 1, which provides a busy signal to all of the call boxes being operated after activation of the first box and provides an unsquelch signal to the inverter 85 of the activated box. The receiver unsquelch signal is applied from the inverter 85 to the lockout bistable circuit 86 to prevent the operation thereof and the consequent removal of power from the receiver and transmitter of the call box. The $V_2$ voltage, which originated with the operation of switch 79, turns on the ringer astable circuit 91 and, consequently, the ringer oscillator 112 to provide a telephone type ringing in the hand set earpiece. The ringing continues until the console operator acknowledges the call by transmitting a 1950 Hz connect tone burst. The 1950 Hz connect tone is received by the call box receiver and coupled from the receiver discriminator (not shown) through the clipper amplifier 95 and gated emitter follower 96 to the connect tone decoder circuit 98. The connect tone decoder 98 turns on the bistables 87 and 99. Bistable 99 disables the ringer astable 91 to remove the ringing tone from the earpiece. Bistable 87 supplies a signal to turn on the audio gate 113 and allow audio from the receiver to pass therethrough to the earpiece. The bistable 87 also applies a signal to the $F_1$ select circuit 102, which in turn grounds the $F_1$ ground terminal of the transmitter to allow transmission on the $F_1$ channel. The $F_1$ select circuit 102 also applies the ground to the time out timer 101 which starts the operation thereof.

The motorist at the call box is now in full duplex communication with the operator at the console 10 and will remain in communication until one of three occurrences. Communications are broken by the motorist cradling the hand set, the time out timer 101 operating to disable the $V_4$ start circuit 78 and stop the transmitter two minutes after the transmitter is started by the $F_1$ select circuit 102, or the console operator unkeying the terminal station transmitters to provide a squelch signal through the inverter 85 to operate the lockout bistable circuit 86. The console operator can send additional 1950 Hz connect tone bursts, which tone is applied to the reset monostable circuit 100 from the connect tone decoder 98. Each time the reset monostable circuit 100 receives a tone from the decoder 98 it resets the time out timer 101 for another 2 minute time period.

If the $F_1$ channel is already in use when the motorist lifts the hand set 42 an unsquelch signal will be provided through the inverter 85 to the $F_1/F_2$ select circuit 89 and to the bistable circuit 87. The output of the select circuit 89 will operate the second caller bistable circuit 90 which will activate the $F_2$ select circuit 97 to ground the $F_2$ ground terminal of the transmitter and place the transmitter in the $F_2$ channel. The unsquelch signal applied to the bistable circuit 87 will maintain the $F_1$ select circuit 102 inoperative. An output from the second caller bistable 90 will also be applied to the lockout bistable 86 to prevent the operation thereof and the consequent removal of power from the transmitter and receiver. Also, the second caller bistable circuit 90 will operate the busy lamp switch 105 and the ringer astable circuit 91 will drive the busy lamp 107 through the busy lamp driver 106 at the ringing frequency. The blinking of the busy lamp 107 will indicate to the motorist that the line is busy (another call is in progress).

As soon as the console operator unkeys the terminal stations after concluding with the first caller, the receiver at the call box being described squelches. The squelch signal from the receiver is applied through the inverter 85 to the second call revert circuit 88 which sets the revert bistable 80. The revert bistable 80 turns on the control monostable 77 to simulate the uncradling of the hand set 42, or the closing of the switch 79. The circuitry then begins operation as if the motorist had just removed the hand set 42 from the cradle 41.

Thus, the entire system is checked out each time a motorist uses a call box and the motorist is given clear indications if the system is operating properly or if the main channel is busy. When the system is not operating properly the motorist can quickly determine that fact and move to another call box. Also, if the main channel is busy the second channel provides the console operator with an indication of a second caller and the second caller is automatically switched to the main channel when the first caller is finished. A timer in the second caller revert circuit 88 samples the output of the inverter 85 for 5 milliseconds every 5 to 6 seconds so that the second caller will quickly be connected into the main channel when the first caller is finished but, in the event that several callers are waiting, they will not all be connected to the main channel simultaneously.

Referring to FIG. 5 a block diagram of the console 10 is illustrated. The console 10 includes a primary caller receiver 150 which is tuned to receive signals when the transmitter of a call box is on the $F_1$ channel and a second caller receiver 151 tuned to receive signals when a call box is on the $F_2$ channel. The primary caller receiver 150 is connected to a tone amplifier decoder 152 which supplies receiver audio signals to a hand set 153 and through a speaker audio amplifier 154 to a speaker 155. When the receiver 150 receives the 1500 Hz tone transmitted by the call box a logic circuit 160 provides a primary caller indicate signal to a printer sequencing and control circuit 161. The tone amplifier decoder 152 is also connected to a tone generator and line driver circuit 175. Upon receiving the primary caller indicate signal, the tone generator and line driver circuit 175 keys all terminal stations, the printer sequencing and control circuit 161 applies a control pulse to a digital printer and printer logic circuitry 162. A digital clock 163 provides the printer logic with digital information representative of the time, which is printed upon the reception of a print command from a logic interface circuit 165. Calendar selection switches 166, which may simply be thumb wheel type settings or the like, are connected to the digital clock 163 to provide indications of the day and month.

Subsequent to the transmission of the 1500 Hz tone, the call box transmits 20 bits of information, which information is representative of the address and status, or condition, of the call box. The address and status information is supplied by the decoder logic circuit 160 to a data gating circuit 167 and to a primary caller address and status display device 168. The display device 168 provides a visual display of the address and status to the console operator. The printer sequencing and control circuit 161 supplies a timing control signal to the data gating circuit 167 which then supplies the address and status information to the digital printer and printer logic 162.

The digital printer and printer logic 162, the printer sequencing and control 161 and the data gating 167 all interact to convert digital information into a readable form and to print the information in a desired format. Equipment such as this can be purchased commercially from a number of sources. An example of such equipment is included in the system disclosed in U.S. Pat. No. 2,905,390 entitled "Data Transfer System", although much less expensive and simpler equipment would be used in the present system. Somewhat simpler equipment is disclosed in U.S. Pat. No. 3,419,678 entitled "Data Printing System".

Transmissions by the operator of the console 10 to the call box are controlled by the logic interface circuit 165. A normally closed access switch 170 is connected in series with a hook, or cradle, switch 171 between ground and the logic interface 165. When the hand set 153 is uncradled, or raised, to answer a call request, the hook switch 171 is closed and a signal is applied to the tone generator and line driver circuit 175. The tone generator and line driver circuit 175 supplies a connect tone of 1950 Hz to a transmitter 176, which connect tone is supplied through the backbone to the terminal stations 15 and 25 and, thus, to the call boxes. When the burst of connect tone is completed the operator can talk into the hand set 153 and the audio is connected through the tone generator and line driver circuit 175 to the transmitter 176 from which it is communicated to the correct call box.

The logic interface 165 contains a time out timer which operates for 1.75 minutes and at 1.75 minutes an alert tone is connected from the logic interface 165 to the hand set. Upon hearing the alert tone the operator now should make a decision to either extend the console and box timing circuits, or complete communication with the calling box within approximately 15 seconds. The operator can terminate the call by hanging up the hand set and opening the hook switch 171, or by depressing access switch 170, or he can depress a reset switch 180, connected between ground and the logic interface circuit 165, which will reset the time out timer to provide another 2 minutes of communications. Depressing the reset switch 180 automatically causes the tone generator and line driver 175 to send another burst of connect tone from the transmitter 176 to the call box, which resets the time out timer in the call box as previously described. In addition, activation of reset switch 180 will also reset the console 1.75 minute alert tone timer in the logic interface 165.

If a second caller activates a call box while a primary caller is still communicating with the operator, the second caller receiver 151 supplies the tone and data through a tone amplifier decoder 185 to a decoder logic circuit 186. A second caller indicate signal is connected from the decoder logic circuit 186 to the sequencing and control circuit 161 which supplies a timing control signal to the data gating circuit 167. Upon receiving the second caller indicate signal the sequencing and control circuit 161 causes the digital printer 162 to print out the time and date. The address and status data is supplied from the decoder logic circuitry 186 to the data gating 167 which supplies it to the digital printer 162 upon receiving a timing control signal from the sequencing and control circuit 161. The address and status data is also supplied to a second caller address and status display device 187 which provides a visual display of the information on the second caller to the operator. A reset signal is supplied to the decoder logic 186 from the logic interface 165 when the second caller is switched to the primary channel, where primary calling information takes place as already described.

The console operator has the option of interrogating any or all of the call boxes to determine the status or condition thereof at any time during the day. An interrogation switch 190 applies ground to an interrogation control logic circuit 191 upon the closing thereof. The interrogation control logic circuit 191 causes the tone generator 175 to provide a center tone, by way of the transmitter 176, to the terminal stations. The timer 116 (FIG. 4) in each of the call boxes is turned on for ½ second each 30 seconds and the interrogate tone is transmitted by the transmitter 176 for 45 seconds so that each call box will turn on during the transmission. Prior to the transmission the console operator selects the address of a specific call box by adjusting interrogation address selection mode control switches 192. The switches 192 can be thumb wheel switches or any other convenient switches for selecting desired digits in a multidigit number. The switches 192 are connected to an address generator and data comparator 193, the output of which is applied to an interrogation data encoder 194 and to the control logic 191. The present system is set up so that the operator may sequentially call all of the call boxes by adjusting all of the switches 192 to zero. The system will then sequentially interrogate each call box in the system.

The interrogation data encoder 194 supplies an output to the tone generator and line driver 175 which causes the transmitter 176 to send the address information to the call boxes. Each call box has an interrogate board operatively connected therein (not shown), powered by the monostable 117, which receives the address information by way of the call box receiver and compares the information to an address card connected thereto. The call box having the correct address then retransmits its address and the four binary bits designating the condition or status of the box. The address and status signals transmitted by the call box are received in the receiver 150 and passed through the amplifier decoder 152 and decoder logic 160 to the address generator and data comparator 193. The address generator and data comparator 193 compares the received information with the transmitted address and supplies an output to the printer sequencing and control circuit 161 which causes the data gating circuit 167 to supply the information to the digital printer and printer logic circuit 162. If the address is correct and the status signals are all normal the address and pluses for the status are printed. If the address is wrong the printer prints out all zeros and an asterisk. If any of the status signals are abnormal the printer prints a minus in the position of the abnormal reading and an asterisk after the twenty bits are complete. Once every 24 hours the digital clock and gating circuit 163 supplies a signal to the interrogation control logic 191 causing all of the call boxes to be interrogated, regardless of the manual interrogate switch 192.

Thus, an emergency communications system is disclosed which is always readily available to persons requiring emergency aid and which provides the person with familiar indications of the operation thereof. Further, each time a call box is used an indication of the status or condition of the call box is transmitted to the console operation and, in addition, the console operator has the option of interrogating call boxes individually or interrogating all of the call boxes sequentially. Further, because the call boxes are in communication with terminal stations by a radio link, the number and position of call boxes can be readily altered without affecting the overall system. In addition to the communications link described above, the system can be used as a remote sign control and for gathering traffic data. Further, by including a transceiver in each automobile and some relatively simple control circuitry the present system could be used for direct communications from the automobile.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. An emergency communications system comprising:
   a. a control console including a transceiver with a transmitter and receiver portion;
   b. a plurality of terminal stations positioned at spaced apart locations remote from said console, each including a transceiver with a transmitter and receiver portion in communication with said console;
   c. a plurality of call boxes fixedly positioned at spaced apart locations adjacent to each terminal station, each of said call boxes including a transceiver tuned for full duplex communications with the transceiver in said adjacent terminal station;
   d. switch means positioned in each of said call boxes for operation by a person in an emergency;
   e. first circuit means positioned in each of said call boxes and connected to said switch means and said call box transceiver for causing said call box transceiver to transmit a first signal of predetermined duration to the transceiver of said console through the transceiver in said adjacent terminal station upon actuation of said switch means;
   f. first circuit means positioned in said console and connected to the console transceiver for causing to be transmitted a signal to said terminal stations, upon reception of the first signal from one of said call boxes, for keying the transmitter portion of the transceiver in each of said terminal stations to provide a busy signal to all remaining call boxes;
   g. ringing circuit means positioned in each of said call boxes and connected to said call box transceiver for providing a ringing signal to the person operating said one of said call boxes upon reception of a signal from the keyed transmitter portion of the transceiver in its respective adjacent terminal station responsive to said signal;
   h. transmitted from said console second circuit means positioned in each of said call boxes and connected to said first circuit means for automatically causing to be transmitted by said call box transceiver subsequent to the first signal, a second signal indicative of the address of said call box and condition of predetermined portions of the call box;
   i. second circuit means positioned in said console and connected to the console transceiver for indicating the address and condition of said calling call box upon reception of the second signal from said call box transceiver by way of the transceiver in its respective adjacent terminal;
   j. station busy signal indicating means positioned in each of said call boxes and connected to receive busy signals from said adjacent terminal stations for indicating one of said call boxes in the system is in use upon reception of a busy signal; and
   k. transducer means mounted in each of said call boxes and in said control console and operatively connected to the transceivers therein for voice communication between any of said call boxes and said control console.

2. An emergency communications system as claimed in claim 1 wherein the terminal stations are connected to the console through a wire line.

3. An emergency communications system as claimed in claim 1 wherein the transducer means includes a hand set having a microphone and a speaker therein connected to the transceiver in each call box and positioned to activate the switch means when said hand set is raised from a cradled position.

4. An emergency communications system as claimed in claim 3 wherein each of the call boxes includes a weatherproof housing having an access door therein.

5. An emergency communications system as claimed in claim 4 having in addition second switch means positioned in each of said call boxes and mounted for activation when the access door is opened, each of said second switches being connected to the call box transceiver for applying power thereto upon activation of said second switch.

6. An emergency communications system as claimed in claim 5 wherein each of the call boxes includes an internal battery connected to power the circuitry therein.

7. An emergency communications system as claimed in claim 6 wherein each of the call boxes includes sensing means connected to the second circuit means for indicating normal and abnormal conditions of the internal battery, the access door, the hand set and an internal enclosure of the electronics components, and the second signal transmitted by the call box transceiver includes an indication of the sensing means output.

8. An emergency communications system as claimed in claim 1 including in addition timing means connected to the transceiver in each call box for automatically turning off the transmitter portion thereof after a predetermined period of time.

9. An emergency communications system as claimed in claim 1 wherein the console includes circuitry for interrogating each call box as to the condition of predetermined portions thereof and each call box includes circuitry for periodically activating the receiver portion of the transceiver therein and for activating the transmitter portion of the transceiver therein in response to a received interrogation signal from the console.

10. An emergency communications system as claimed in claim 1 wherein the transmitter portion of the transceiver in each call box includes a primary and secondary channel and a selection circuit for activating the unused channel during operation of the transceiver and each terminal station has a second receiver portion associated with the transceiver therein, tuned to the secondary channel for providing the console with an indication of a second caller when the primary channel is being used.

11. An emergency communications system as claimed in claim 1 including in addition a plug in address card for each call box connected to the second circuit means to provide each call box with a predetermined address.

* * * * *